(12) United States Patent
Lei et al.

(10) Patent No.: US 10,984,050 B2
(45) Date of Patent: Apr. 20, 2021

(54) METHOD, APPARATUS, AND COMPUTER PROGRAM PRODUCT FOR MANAGING STORAGE SYSTEM

(71) Applicant: EMC IP Holding Company LLC, Hopkinton, MA (US)

(72) Inventors: Lu Lei, Shanghai (CN); Ao Sun, Shanghai (CN); Gary Jialei Wu, Shanghai (CN); Yu Teng, Shanghai (CN); Wesley Wei Sun, Shanghai (CN); Chun Xi Kenny Chen, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 112 days.

(21) Appl. No.: 16/236,264

(22) Filed: Dec. 28, 2018

(65) Prior Publication Data
US 2020/0042559 A1 Feb. 6, 2020

(30) Foreign Application Priority Data
Aug. 3, 2018 (CN) .......................... 201810877731.2

(51) Int. Cl.
*G06F 16/00* (2019.01)
*G06F 16/901* (2019.01)
*G06F 16/9038* (2019.01)
*G06F 3/06* (2006.01)

(52) U.S. Cl.
CPC .......... *G06F 16/9027* (2019.01); *G06F 3/061* (2013.01); *G06F 3/0638* (2013.01); *G06F 3/0689* (2013.01); *G06F 16/9038* (2019.01)

(58) Field of Classification Search
CPC .. G06F 16/9027; G06F 16/9038; G06F 3/061; G06F 3/0638; G06F 3/0689; G06F 16/2246
USPC ........................................................ 707/797
See application file for complete search history.

(56) References Cited

U.S. PATENT DOCUMENTS 5,748,952 A * 5/1998 Chadha ............... G06F 16/2246
7,774,346 B2 * 8/2010 Hu ....................... G06F 16/2237
707/745

* cited by examiner

*Primary Examiner* — Vincent F Boccio
(74) *Attorney, Agent, or Firm* — Amin, Turocy & Watson, LLP

(57) ABSTRACT

A method, apparatus and computer program product for managing a storage system are provided. For example, in a method, a tree index of the storage system is obtained, where a leaf node among multiple leaf nodes in the tree index comprising a keyword and an attribute of an object among multiple objects in the storage system. Respective attributes of nodes in a set of the multiple leaf nodes in the tree index are obtained, and the set of the multiple leaf nodes having a same parent node. The tree index is updated based on respective attributes of the leaf nodes in the set of the multiple leaf nodes. With the above example implementations, performance of the index of the storage system can be increased, and further overall response speed of the storage system can be improved. Further, there is provided an apparatus and computer program product for managing a storage system.

20 Claims, 9 Drawing Sheets

US 10,984,050 B2

METHOD, APPARATUS, AND COMPUTER PROGRAM PRODUCT FOR MANAGING STORAGE SYSTEM

RELATED APPLICATION

The present application claims the benefit of priority to Chinese Patent Application No. 201810877731.2, filed on Aug. 3, 2018, which application is hereby incorporated into the present application by reference herein in its entirety.

FIELD

Various implementations of the present disclosure generally relate to storage management, and more specifically, to a method, apparatus and computer program product for managing an index in a storage system (e.g., Redundant Array of Independent Disks (RAID)).

BACKGROUND

With the development of data storage techniques, various data storage devices now provide users with increasingly high data storage capacity, and their data access speed has been improved greatly. With the increase of data storage capacity, users also impose greater demands on response time of storage systems. So far, there have been developed technical solutions for building an index for data stored in a storage system so as to accelerate data access speed. However, during the operation of the storage system, it is necessary to traverse the index so as to look up desired data. This will cause great time cost and further reduce response speed of the storage system. At this point, how to improve response speed of the storage system becomes a focus of research.

SUMMARY

Therefore, it is desirable to develop and implement a technical solution for managing a storage system more effectively. It is desired that the technical solution can be compatible with existing storage systems and manage existing storage systems more effectively by reconstructing various configurations of these storage systems.

According to a first aspect of the present disclosure, there is provided a method for managing a storage system. In the method, a tree index of the storage system is obtained, where a leaf node among multiple leaf nodes in the tree index comprising a keyword and an attribute of an object among multiple objects in the storage system. Respective attributes of nodes in a set of leaf nodes in the tree index are obtained, and the set of leaf nodes having the same parent node. The tree index is updated on the basis of respective attributes of nodes in the set of leaf nodes.

According to a second aspect of the present disclosure, there is provided an apparatus for managing a storage system, comprising: at least one processor; a volatile memory; and a memory coupled to the at least one processor, the memory having instructions stored thereon, the instructions, when executed by the at least one processor, causing the apparatus to perform acts. The acts include: obtaining a tree index of the storage system, a leaf node among multiple leaf nodes in the tree index comprising a keyword and an attribute of an object among multiple objects in the storage system; obtaining respective attributes of nodes in a set of leaf nodes in the tree index, the set of leaf nodes having the same parent node; and updating the tree index on the basis of respective attributes of nodes in the set of leaf nodes.

According to a third aspect of the present disclosure, there is provided a computer program product. The computer program product is tangibly stored on a computer readable medium and comprises machine executable instructions which, when executed, cause the machine to implement a method according to the first aspect.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

Example implementations of the present disclosure will be described in more details with reference to the drawings. Although the drawings illustrate the example implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
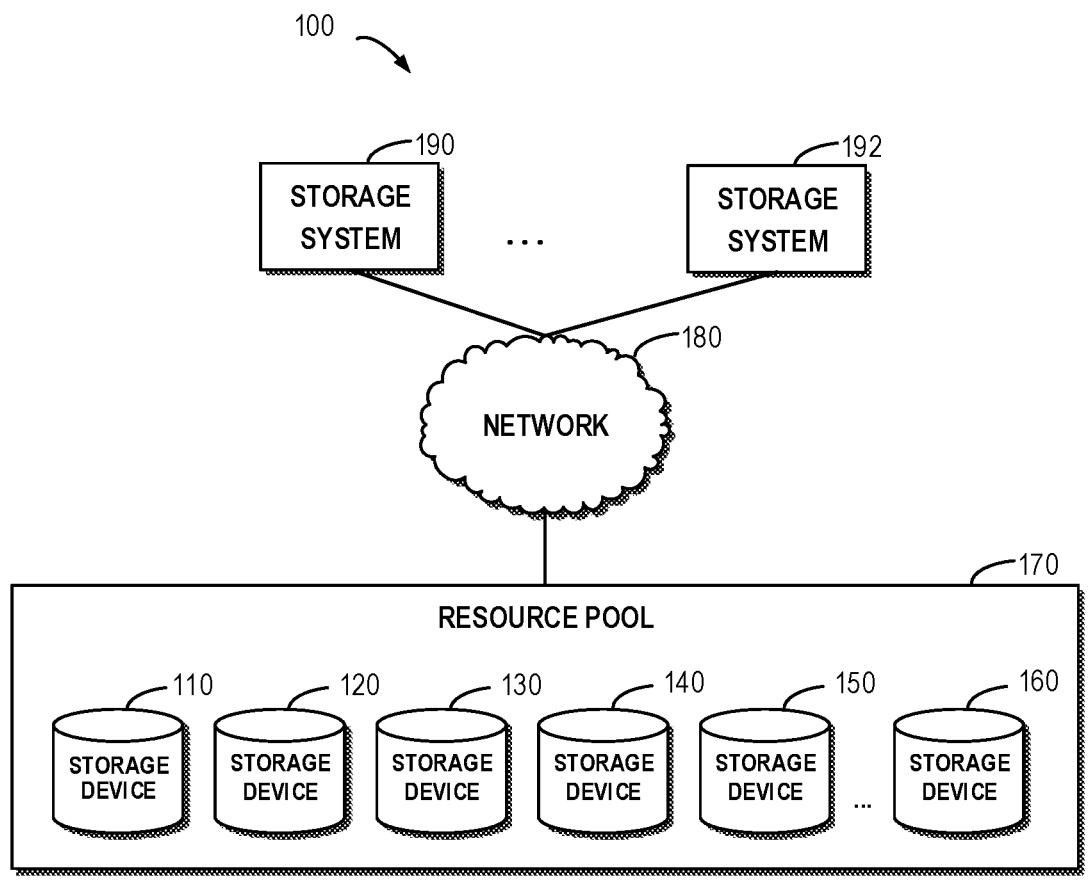
FIG. 1 illustrates a schematic view of a storage system in which a method of the present disclosure may be implemented.

Varieties of storage systems have been developed so far. Specifically, FIG. 1 shows a schematic view 100 of a storage system in which a method of the present disclosure may be implemented. As depicted, a resource pool 170 may be provided, and the resource pool 170 may comprise multiple storage devices 110, 120, 130, 140, 150, . . . , and 160. Although multiple independent physical storage devices 110, 120, 130, 140, 150, . . . , and 160 are shown here, according to example implementations of the present disclosure, storage devices may further be virtual storage devices. One or more storage systems may be provided on the basis of the resource pool 170. For example, storage systems 190 and 192 may access storage space in storage devices in the resource pool 170 via a network, so as to provide data access services to users.

Figure 2:
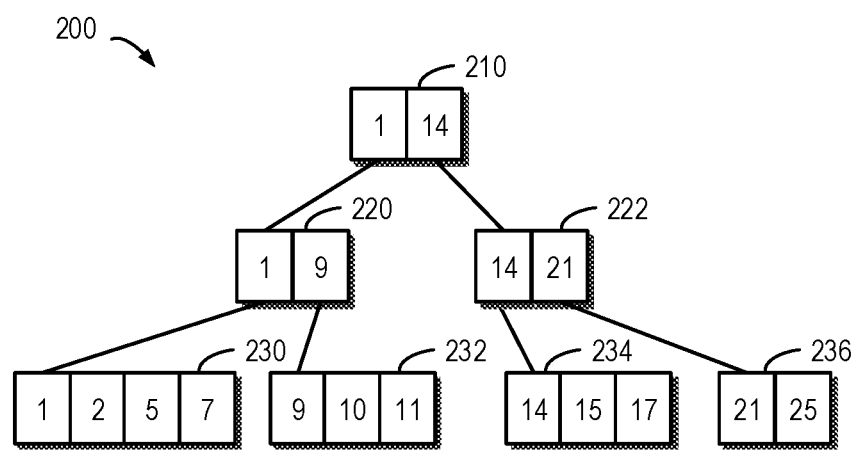
FIG. 2 schematically illustrates a block diagram of a tree index of a storage system according to one solution.

As storage space of a storage system expands, an index needs to be built for objects in the storage system so as to access objects in the storage system more quickly and effectively. FIG. 2 schematically shows a block diagram of a tree index 200 of the storage system 190 according to one solution. As depicted, the tree index 200 comprises multiple levels. For example, the tree index 200 may be provided as a form of a binary tree, at which point each non-leaf node of the binary tree comprises two keywords. For example, a root node 210 may comprise keywords 1 and 14. According to rules of the binary tree, objects with keywords falling in a range [1, 14) will be stored at the left child tree of the root node 210, and objects with keywords being larger than or equal to 14 will be stored in the right child tree of the root node 210.

At a root node 220 of the left child tree, there are further comprised keywords 1 and 9. At this point, according to rules of the binary tree, objects with keywords falling in a range [1, 9) will be stored on the left of the node 220, while objects with keywords being larger than or equal to 9 and less than 14 will be stored on the right of the node 220. As shown in FIG. 2, related content of objects with keywords 1, 2, 5 and 7 will be stored on a left leaf node 230, and related content of objects with keywords 9, 10 and 11 will be stored on a right leaf node 232.

For the right child tree of the root node 210, its root node 222 comprises keywords 14 and 21. At this point, according to rules of the binary tree, objects with keywords falling in a range [14, 21) will be stored on the left of the root node 222, while objects with keywords being larger than or equal to 21 will be stored on the right of the root node 222. Related content (e.g., type, position and owner, etc.) of objects with keywords 14, 15 and 17 will be stored on a left leaf node 234, and related content of objects with keywords 21 and 25 will be stored on a right leaf node 236.

It will be understood although FIG. 2 merely illustrates a binary tree-shaped tree index 200, according to example implementations of the present disclosure, the tree index 200 may further be provided as other forms. For example, the tree index 200 may be stored in the form of a multi-way tree, B+ tree and so on. It will be understood although FIG. 2 merely illustrates such a case where the tree index 200 comprises two levels of non-leaf nodes, according to example implementations of the present disclosure, the tree index 200 may further comprise more or less levels.

According to the technical solution shown in FIG. 2, if there is a need to query which types of objects are stored in the storage system 200, the tree index 200 has to be traversed so as to obtain from each leaf node the type of an object corresponding to the leaf node. Generally, a non-leaf node that is farthermost from the root node 210 comprises a large number of leaf nodes (e.g., thousands and even tens of thousands), at which point each leaf node needs to be traversed one after another, so as to obtain desired information. This will bring about great time cost and further cause low response speed of the storage system.

To solve the above drawbacks, implementations of the present disclosure provide a method, apparatus and computer program product for managing a storage system.

Figure 3:
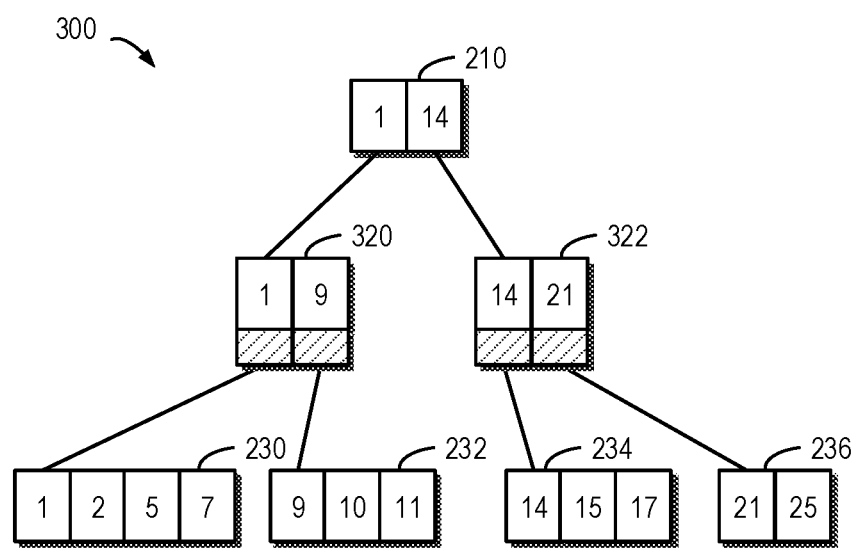
FIG. 3 schematically illustrates a block diagram of a tree index of a storage system according to implementations of the present disclosure.

According to example implementations of the present disclosure, proposed is an improved index structure. With reference to FIG. 3, specific implementations of the present disclosure will be described in detail. FIG. 3 schematically shows a block diagram of a tree index 300 of a storage system 190 according to implementations of the present disclosure. As depicted, parent nodes (e.g., nodes 320 and 322 that are farthermost from the root node 210) of leaf nodes in the tree index 200 as shown in FIG. 2 may be expanded so as to form the improved tree index 300. By adding portions shown as shaded patterns to the parent nodes 320 and 322, some information about objects in leaf nodes may be recorded at a higher level of the tree index 300. Further, when querying information about objects in the storage system 190, there is no need to traverse content of each leaf node any more, but related information may be obtained on the basis of records in the parent nodes 320 and 322 of leaf nodes.

Figure 4:
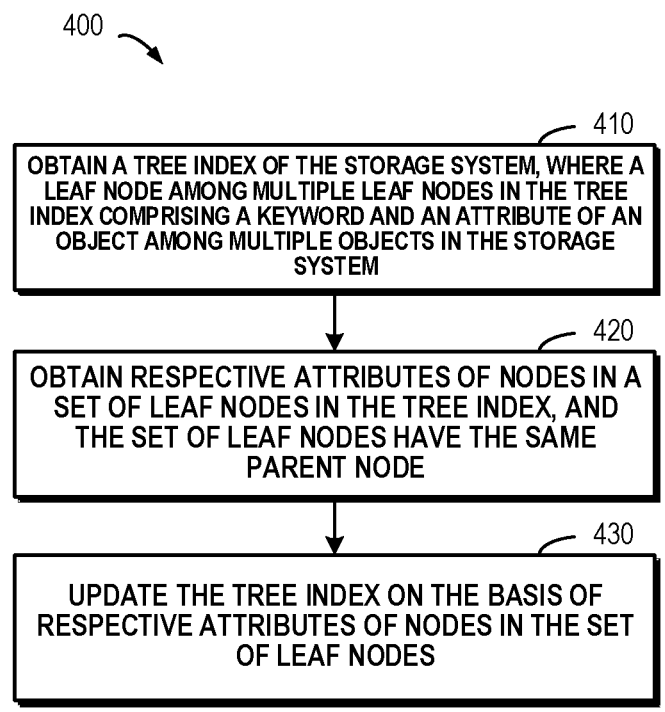
FIG. 4 schematically illustrates a flowchart of a method for managing a storage system according to implementations of the present disclosure.

FIG. 4 schematically shows a flowchart of a method 400 for managing a storage system 190 according to implementations of the present disclosure. As depicted, at block 410, a tree index (here the tree index refers to an index built by a traditional method) of the storage system 190 may be obtained, a leaf node among multiple leaf nodes in the tree index may comprise a keyword and an attribute of an object among multiple objects in the storage system 190. In this implementation, the attribute may comprise at least one of: a type of the object, a position of the object and an owner of the object.

At block 420, respective attributes of nodes in a set of leaf nodes in the tree index may be obtained, here the set of leaf nodes having the same parent node. It will be understood in this implementation, the set of leaf nodes may comprise all leaf nodes in the tree index or may comprise part of leaf nodes. For example, the operation as shown in block 420 may be executed with respect to each of non-leaf nodes that are farthermost from a root node in the tree index. Then at block 430, the tree index may be updated on the basis of respective attributes of nodes in the set of leaf nodes, so as to form an updated tree index 300 as shown in FIG. 3. Here attributes associated with various objects may be added to non-leaf nodes in the tree index.

According to example implementations of the present disclosure, an abstract field may be added to the parent node of the set of leaf nodes, so as to update content of non-leaf nodes that are farthermost from the root node in the tree index. Specifically, statistical information may be determined on the basis of respective attributes of leaf nodes in the set of leaf nodes, and the determined statistical information may be added to the abstract field. With the above example implementations, corresponding statistical information may be added to the abstract field according to different attributes. Since the abstract field already records statistical information about related attributes of various objects in leaf nodes, there is no need to traverse each leaf node during query operation, but related information may be obtained from the abstract field. In this way, the response speed of the storage system 190 may be accelerated, and user waiting time may be reduced. With reference to FIG. 5, more details about the abstract field will be described in detail.

Figure 5A:
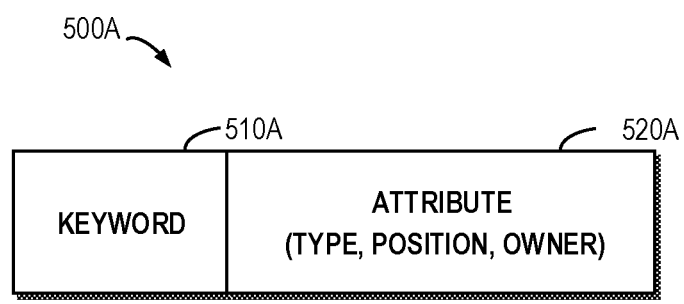
FIG. 5A illustrates a schematic view of a leaf node according to implementations of the present disclosure.

FIG. 5A shows a schematic view of a leaf node 500A according to implementations of the present disclosure. In the leaf node 500A, there may be comprised a keyword 510A and an attribute 520A. Here the keyword 510A is a keyword of an object stored in the storage system 190. It will be understood although the keyword has been shown in the form of a number with reference to FIGS. 2 and 3, according to example implementations of the present disclosure, the keyword 510A may further be provided as other form. For example, the keyword 510A may comprise a letter, a number, a symbol, etc., so long as the keyword 510A can uniquely identify an object in the storage system 190.

According to example implementations of the present disclosure, the attribute 520A comprise content in one or more aspects. For example, the attribute 520A may comprise at least one of: a type (e.g., text type, audio type, image type, etc.) of the object represented by the keyword 510A; a position (e.g., represented by a unique identifier of a storage device where the object exists and an address of the object in the storage device) where the object represented by the keyword 510A is stored in the storage system 190; an owner of the object represented by the keyword 510A, i.e. by which user the object is owned. It will be understood the attribute in FIG. 5A is merely illustrative, according to example implementations of the present disclosure, the attribute may comprise more or less attributes.

Figure 5B:
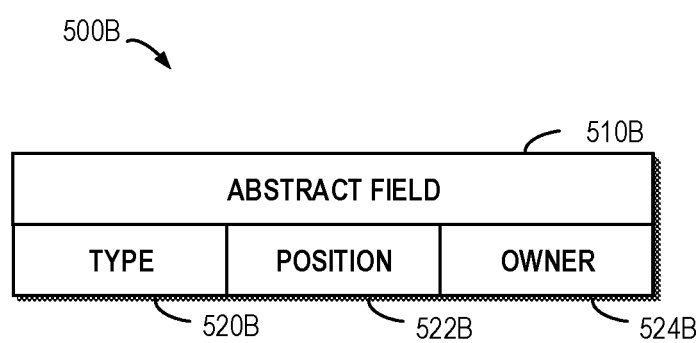
FIG. 5B illustrates a schematic view of an abstract field according to implementations of the present disclosure.

FIG. 5B shows a schematic view 500B of an abstract field according to example implementations of the present disclosure. As depicted, in view of the attribute comprised in the leaf node, the abstract field 510B may comprise one or more parts. Suppose the attribute 520A in the leaf node 500A comprises three items: type, position, owner, then the abstract field 510B may comprise content of the three items: a type 520B, a position 522B and an owner 524B. For example, the type 520B may comprise the type of an object in a child node (i.e. leaf node) of a parent node where the abstract field 510B exists. Suppose at this point the parent node is the node 320 as shown in FIG. 3, then the type 520B in the abstract field 510B may be updated on the basis of types of objects in all child nodes 230 and 232 of the node 320.

For the purpose of brief description, various implementations of the present disclosure will be described by taking types as one example of attributes. According to example implementations of the present disclosure, attributes may further comprise one or more other aspects. Those skilled in the art may derive other possible implementations from the implementation about "type" in the present disclosure.

Figure 6A:
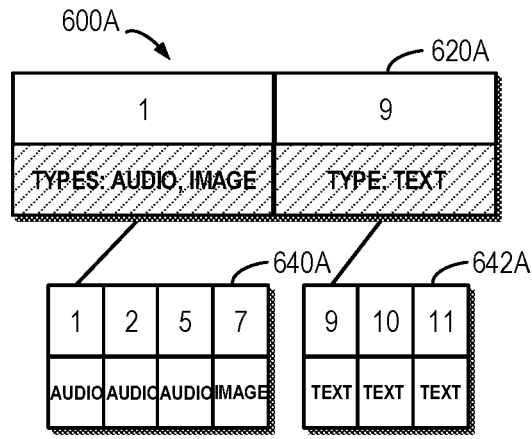
FIGS. 6A, 6B and 6C each schematically illustrates a block diagram for determining an abstract field according to implementations of the present disclosure.
Figure 6B:
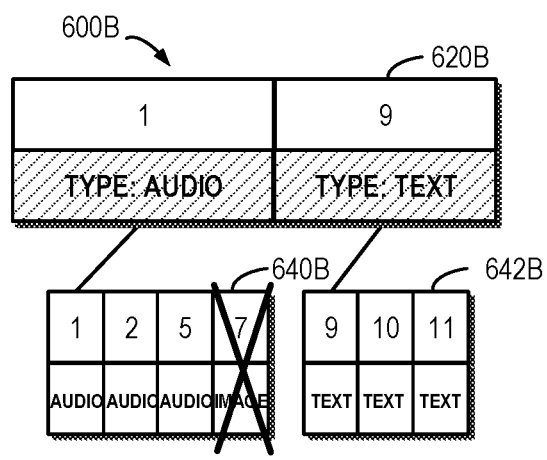
Figure 6C:
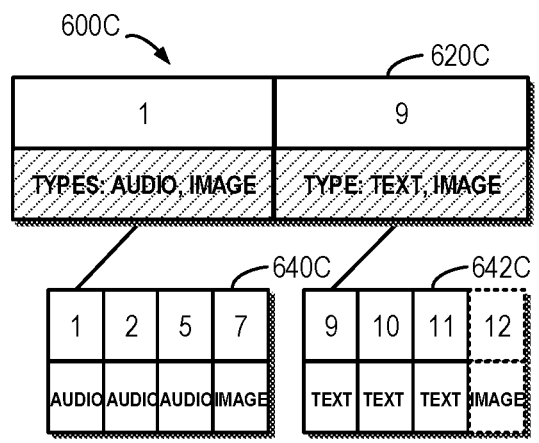

With reference to FIGS. 6A to 6C, description is presented below to how to determine content in the abstract field 510B. FIG. 6A schematically shows a block diagram 600A about determining an abstract field according to implementations of the present disclosure. According to example implementations of the present disclosure, an abstract field shown as a shaded pattern may be inserted to a non-leaf node 620A in a traditional tree index, and child nodes of the non-leaf node 620A are leaf nodes 640A and 642A. With reference to the left leaf node 640A, this leaf node comprises 4 objects. Suppose at this point the attribute is "type," and types of the 4 objects are audio, audio, audio and image respectively, then types in the non-leaf node 620A may be determined as: audio, image. Similarly, for the right leaf node 642A, the type in the non-leaf node 620A may be determined as: text.

According to example implementations of the present disclosure, the tree index may comprise multiple non-leaf nodes at multiple levels, and the multiple non-leaf nodes describe the sorting among respective keywords of multiple objects. In this implementation, leaf nodes at each level may be determined one by one. Specifically, a branch among multiple branches of the tree index is determined according to the multiple levels; a set of leaf nodes in the branch is determined; and respective attributes of leaf nodes in the set of leaf nodes are obtained.

Returning to FIG. 3, the tree index in FIG. 3 comprises two levels of non-leaf nodes, namely the root node 210 and the first level of non-leaf nodes 320 and 322, and the leaf nodes 230, 232, 234 and 236. At this point, from the root node 210, first the left branch of the root node 210 may be traversed. For example, processing may be performed to the left leaf node 230 and the right leaf node 232 in the non-leaf node 220 in the left branch. Specifically, content of the abstract field in the non-leaf node 320 may be determined according to the method shown with reference to FIG. 5A. For example, the abstract field of the left portion of the non-leaf node 320 may be updated as: audio, image; and the abstract field of the right portion of the non-leaf node 320 may be updated as: text. After completing the processing of the left branch, similar processing may be performed to various nodes in the right branch of the root node.

According to example implementations of the present disclosure, when a query request requesting that information of at least one object matching a target attribute is to be looked up in the storage system 190 is received, a result for the query request may be determined on the basis of statistical information in the abstract field in the updated tree index. With the above example implementations, there is no need to traverse each leaf node in the tree index, but a query result can be obtained simply by querying information in the abstract field in the parent node of leaf nodes. Suppose the query request wants to query the type of an object in the storage system 190, at this point types of all objects comprised in the storage system 190 may be obtained by querying the shaded abstract field in the non-leaf nodes 320 and 322 as shown in FIG. 3.

The operation to determine the abstract field as described with reference to FIG. 6A may be executed at the starting stage of the storage system 190. It will be understood as the storage system 190 runs, content of objects in the storage system 190 may be modified by user access. For example, the user may delete an existing object from the storage system 190 (e.g., may delete a certain image from the storage system 190), may modify an existing object (e.g., may replace video with audio), and may further add a new object to the storage system 190 (e.g., may store a new image to the storage system 190). At this point, a corresponding abstract field needs to be updated according to the latest state of an object in the storage system 190, so that the abstract field may reflect the latest attribute of the object in the storage system 190.

According to example implementations of the present disclosure, if a delete request for deleting an object with a target keyword from the storage system 190 is received, then a target leaf node associated with the target keyword may be looked up in the updated tree index 300 on the basis of the target keyword. Subsequently, an abstract field in a parent node of the target leaf node may be updated. Then, information associated with the target leaf node may be deleted from the tree index 300, and the object with the target keyword may be deleted from the storage system 190. With reference to FIG. 6B, more details on how to update the abstract field on the basis of a delete request will be described in detail.

FIG. 6B schematically shows a block diagram 600B of determining an abstract field according to implementations of the present disclosure. FIG. 6B shows an updated abstract field. Suppose a delete request for deleting the last object (with a keyword 7) in a leaf node 640B is received, at this point the associated target leaf node 640B may be looked up in the tree index on the basis of the keyword 7. Next, an abstract field 620B in a parent node 620B of the target leaf node 640B may be updated. At this point, since an object whose type is image will be deleted, the type in the updated abstract field only comprises audio. Then, information on the object with the keyword 7 may be deleted from the target leaf node 640B, and the object with the keyword 7 may be deleted from the storage system 190.

According to example implementations of the present disclosure, if an update request for updating an object with a target keyword in the storage system 190 is received, then a target leaf node associated with the target keyword may be looked up in the tree index 300 on the basis of the target keyword, and an abstract field in a parent node of the target leaf node may be updated on the basis of an attribute specified by the update request. Subsequently, the target leaf node may be updated on the basis of the update request; and the object with the target keyword in the storage system may be updated on the basis of the update request.

Still with reference to FIG. 6B, suppose an update request for updating an object with keyword 7 (updating the type of the object from "image" to "audio) is received, then the associated target leaf node 640B may be found on the basis of the keyword 7. The abstract field in the parent node 620B of the target leaf node 640B may be updated on the basis of "audio." At this point, since objects in all leaf nodes are of the "audio" type, the type of the updated abstract field is: audio. Then, the type of the object with the keyword 7 in the target leaf node may be updated as "audio," and the object in the storage system 190 may be updated accordingly.

According to example implementations of the present disclosure, if an insert request for inserting a target object with a target keyword to the storage system 190 is received, then content associated with the target object may be inserted to a leaf node in the tree index 300, and an abstract field may be updated accordingly. Specifically, based on the target keyword, a non-leaf node associated with the target keyword may be looked up in the tree index as an insertion point, here a leaf node of the insertion point being a leaf child node. Subsequently, the number of child nodes of the insertion point may be determined, and the target object may be inserted to the storage system 190 on the basis of the number.

With reference to FIG. 6C, more details on how to update an abstract field on the basis of an insert request will be described in detail. FIG. 6C schematically shows a block diagram 600C of determining an abstract field according to implementations of the present disclosure. If an insert request for inserting a target object (whose type is "image) with a target keyword 12 to the storage system 190 is received, then an insertion point may be looked up in the tree index on the basis of the target keyword 12. Here the insertion point represents a non-leaf node 620C associated with the target keyword 12. Subsequently, the number of objects involved by a child node of the insertion point (i.e. the number of objects comprised in a leaf node 642C) may be determined. As shown in FIG. 6C, it may be determined the number equals 3, and then the target object may be inserted to the storage system 190 on the basis of the number.

It will be understood since the number of objects comprised in each leaf node should be less than or equal to a maximum threshold number (i.e. a maximum leaf node number supported by the storage system 190), different operations may be executed on the basis of a comparison between the determined number and the maximum threshold number. If the number is less than the maximum threshold number, then an insert operation may be executed directly, otherwise a split operation will be executed to the tree index 300. According to example implementations of the present disclosure, if the determined number does not reach a predefined maximum leaf node number, then a leaf node may be directly added to the insertion point, here the leaf node comprising a keyword and an attribute of the target object. Subsequently, an abstract field in the insertion point may be updated on the basis of an attribute of the target keyword. With the above example implementations, operations may be executed accordingly depending on whether the number amounts to the maximum leaf node number. Hence, on the one hand it may be ensured the tree index 300 may satisfy the definition of the tree index, and on the other hand it may be ensured the abstract node may accurately reflect states of various objects in the current storage system 190.

Suppose the maximum threshold number equals 4, as shown in FIG. 6C, at this point the determined number equals 3, which is less than 4. Therefore, information of an image object with the keyword 12 may be directly inserted to the end of the leaf node 642C (as shown by a dashed box). Subsequently, information of the abstract field in the node 620C may be updated from "type: text" to "type: text, image" so as to indicate types of objects comprised in the child node 642C of the node 620C are text and image.

According to example implementations of the present disclosure, if the number reaches the predefined maximum leaf node number, then a split operation needs to be executed to the tree index 300. Specifically, a parent node of the insertion point may be identified as an insertion parent node, and a first non-leaf node and a second non-leaf node may be added to the insertion parent node. Subsequently, the insertion point may be split into a first leaf node and a second leaf node, and neither of the numbers of objects involved by leaf nodes of the first leaf node and the second leaf node reaches the predefined maximum leaf node number; a keyword and an attribute of the target object may be added to the first leaf node. Abstract fields of the first non-leaf node and the second no-leaf node may be updated on the basis of an attribute of the first leaf node and the second leaf node respectively; and the first leaf node and the second leaf node may be represented as a child node of the first non-leaf node and the second non-leaf node respectively.

Figure 7A:
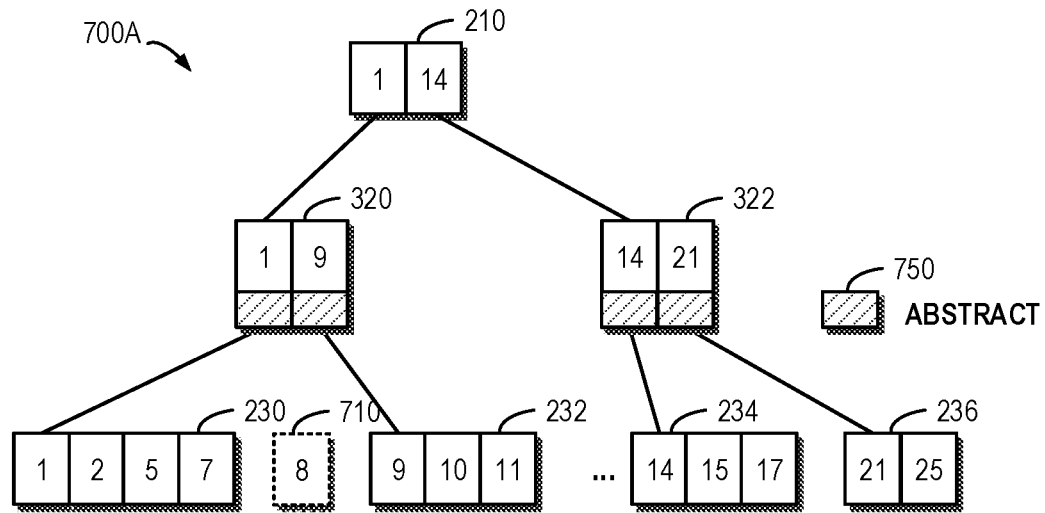
FIGS. 7A and 7B each schematically illustrates a block diagram for splitting nodes in a tree index according to implementations of the present disclosure.

FIG. 7A schematically shows a block diagram of a tree index 700A before being split according to implementations of the present disclosure. The tree index 700A is similar to the tree index 300 as shown in FIG. 3, and the difference lies in that an object (referring to a reference numeral 710) with a keyword 8 is to be inserted to the storage system. Suppose the maximum leaf node number is 4, and at this point the number of child nodes of the node 320 already amounts to 4, so information associated with the object cannot be directly inserted to the leaf node 230 of the node 320. At this point, a split operation needs to be performed to the node 320. Since the object to be inserted has a keyword 8 and needs to be inserted to the left of the node 320, the right child tree of the node 320 will not change. Here a shaded pattern shown by a reference numeral 750 denotes an abstract field in a non-leaf node.

Figure 7B:
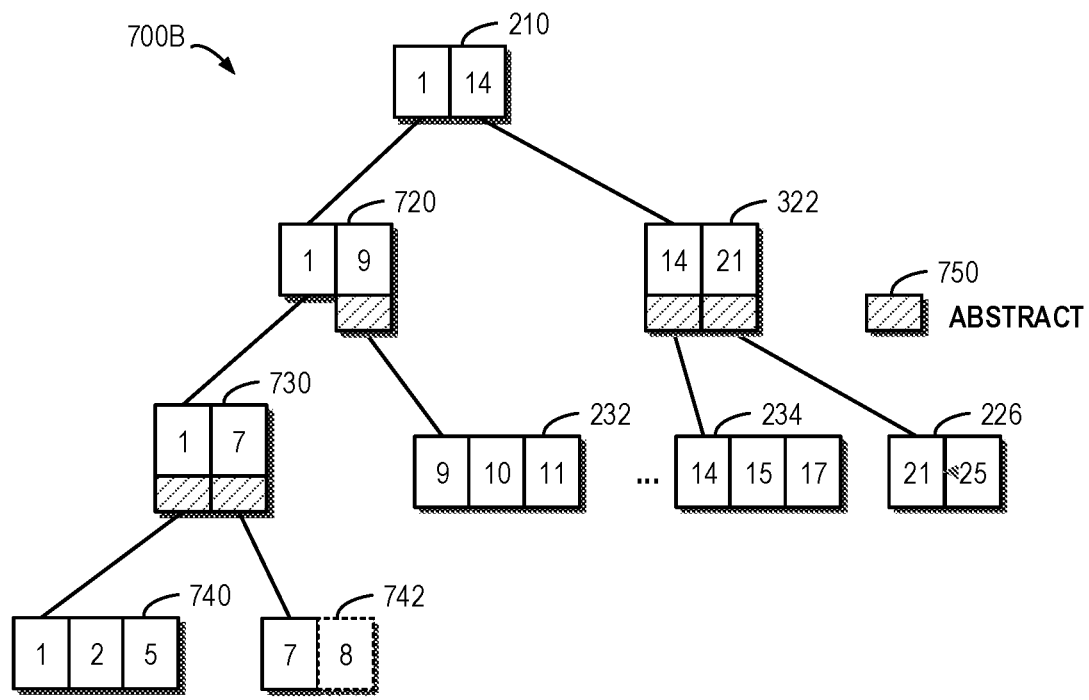

FIG. 7B schematically shows a block diagram of a tree index 700B after being split according to implementations of the present disclosure. As depicted, a node 720 corresponds to the node 320 before being split. As shown in FIG. 7B, the left portion of the node 320 may be split. At this point, levels of the tree index 700B may be increased, e.g., a second level of non-leaf node 730 (comprising a left first node and a right second node) may be added. Next, objects in the leaf node 230 and the inserted object 710 in the leaf node 230 as shown in FIG. 7A may be split so as to form a first leaf node 742 and a second leaf node 740, here the number of leaf nodes of neither the first leaf node (comprising objects with keywords 1, 2 and 5) nor the second leaf node (comprising objects with keywords 7 and 8) reaching the predefined maximum leaf node number. Here, information of the object with the keyword 8 is added to the first leaf node 742. Subsequently, two abstract fields of the non-leaf node 730 may be updated on the basis of attributes of leaf nodes of the first leaf node 742 and the second leaf node 740 respectively.

Figure 8:
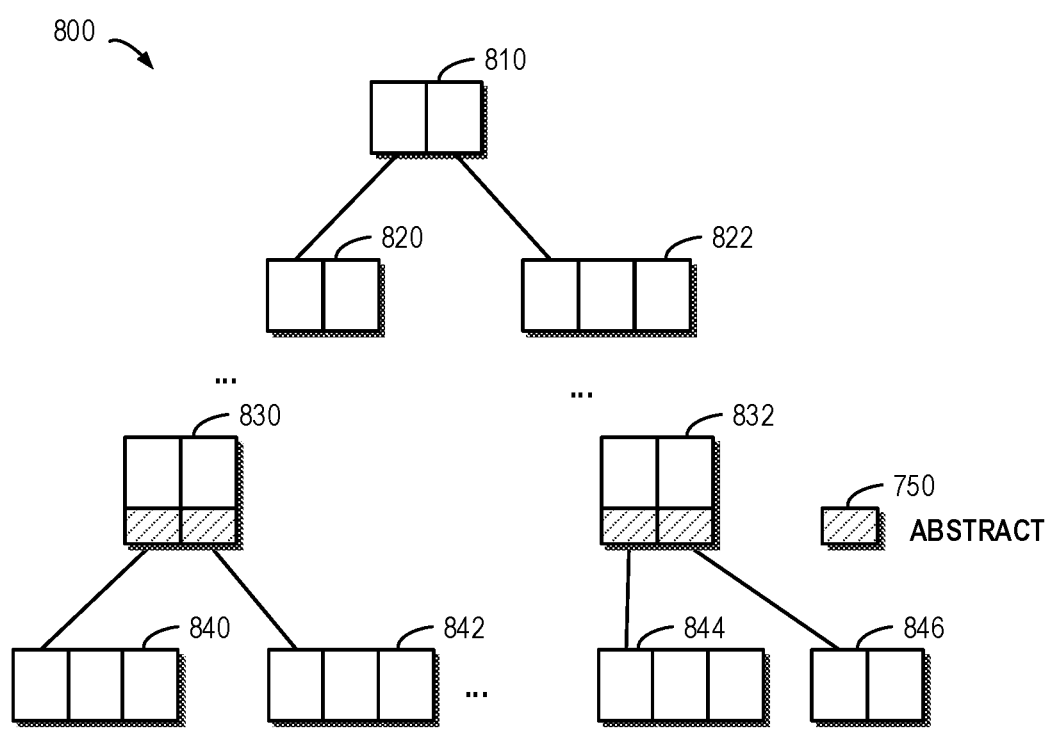
FIG. 8 schematically illustrates a block diagram of a tree index according to implementations of the present disclosure.

It will be understood although a tree index in the form of a binary tree has been illustrated above, the tree index may be constructed by other means according to example implementations of the present disclosure. FIG. 8 schematically shows a block diagram of a tree index 800 according to implementations of the present disclosure. As depicted, a root node 810 may have a left child tree (having a root node of a node 820, and comprising a non-leaf node 830 and leaf nodes 840, 842) and a right child tree (having a root node of a node 822, and comprising a non-leaf node 832 and leaf nodes 844, 846). Here the tree index 800 may be based on a multi-way tree structure and may further comprise more levels.

It will be understood although the example of adding an abstract field at a parent node of a leaf node (i.e. a non-leaf node that is farthermost from the root node) has been illustrated above, according to example implementations of the present disclosure, an abstract field may further be added to other non-leaf node. For an abstract field of a specific non-leaf node, the abstract field may comprise information on attributes of all leaf nodes of child trees that take the non-leaf node as a root node. With the above example implementations, when a query is performed to the tree index, only the abstract field in the non-leaf node needs to be queried, while content of direct or indirect child nodes of the non-leaf node do not need to be queried.

While examples of the method according to the present disclosure have been described in detail with reference to FIGS. 2 to 8, description is presented below to the implementation of a corresponding apparatus. According to example implementations of the present disclosure, provided is an apparatus for managing a storage system. The apparatus comprises: an index obtaining module configured to obtain a tree index of the storage system, a leaf node among multiple leaf nodes in the tree index comprising a keyword and an attribute of an object among multiple objects in the storage system; an attribute obtaining module configured to obtain respective attributes of nodes in a set of leaf nodes in the tree index, the set of leaf nodes having the same parent node; and an updating module configured to update the tree index on the basis of respective attributes of nodes in the set of leaf nodes.

According to example implementations of the present disclosure, the updating module is further configured to: add an abstract field to the parent node in the tree index; determine statistical information on the basis of respective attributes of leaf nodes in the set of leaf nodes; and add the determined statistical information to the abstract field.

According to example implementations of the present disclosure, the tree index comprises multiple non-leaf nodes at multiple levels, the multiple non-leaf nodes describing the sorting among respective keywords of the multiple objects.

According to example implementations of the present disclosure, the attribute obtaining module is further configured to: determine a branch among multiple branches of the tree index according to the multiple levels; determine the set of leaf nodes in the branch; and obtain respective attributes of leaf nodes in the set of leaf nodes.

According to example implementations of the present disclosure, the apparatus further comprises a querying module configured to: receive a query request, the query request requesting that information of at least one object matching a target attribute is to be looked up in the storage system; and determine a result for the query request on the basis of statistical information in the abstract field in the updated tree index.

According to example implementations of the present disclosure, the apparatus further comprises a deleting module configured to: in response to receiving a delete request for deleting an object with a target keyword from the storage system, look up a target leaf node associated with the target keyword in the updated tree index on the basis of the target keyword; update an abstract field in a parent node of the target leaf node; delete information associated with the target leaf node from the updated tree index; and delete the object with the target keyword from the storage system.

According to example implementations of the present disclosure, the apparatus further comprises a database updating module configured to: in response to receiving an update request for updating an object with a target keyword in the storage system, look up a target leaf node associated with the target keyword in the updated tree index on the basis of the target keyword; update an abstract field in a parent node of the target leaf node on the basis of an attribute specified by the update request; update the target leaf node on the basis of the update request; and update the object with the keyword in the storage system on the basis of the update request.

According to example implementations of the present disclosure, the apparatus further comprises an inserting module configured to: in response to receiving an insert request for inserting a target object with a target keyword to the storage system, look up a non-leaf node associated with the target keyword in the updated tree index as an insertion point on the basis of the target keyword, a child node of the insertion point being a leaf node; determine the number of objects involved in child nodes of the insertion point; and insert the target object to the storage system on the basis of the number.

According to example implementations of the present disclosure, the inserting module is further configured to: in response to determining the number does not reach a predefined maximum leaf node number, add a leaf node to the insertion point, the leaf node comprising a keyword and an attribute of the target object; and update an abstract field in the insertion point on the basis of the attribute of the target keyword.

According to example implementations of the present disclosure, the inserting module is further configured to: in response to determining the number reaches the predefined maximum leaf node number, perform tree splitting with respect to the insertion point so as to form a first leaf node and a second leaf node, neither of the numbers of objects involved in leaf nodes of the first leaf node and the second leaf node reaching the predefined maximum leaf node number; add a keyword and an attribute of the target object to the first leaf node; and update an abstract field of a parent node of the first leaf node and the second leaf node on the basis of an attribute of the first leaf node and the second leaf node respectively.

According to example implementations of the present disclosure, an attribute of an object in the storage system comprise at least one of: a type, position and owner of the object.

Figure 9:
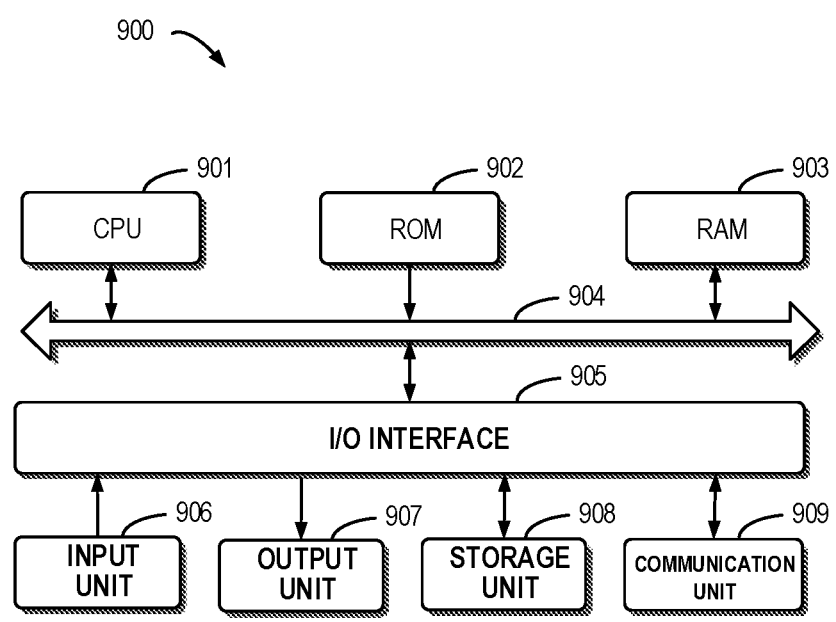
FIG. 9 schematically illustrates a block diagram of an apparatus for managing a storage system according to example implementations of the present disclosure.

FIG. 9 schematically shows a block diagram of an apparatus 900 for managing a storage system according to example implementations of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each process and treatment, such as the method 400, can also be executed by the processing unit 901. For example, in some implementations, the method 400 can be implemented as a computer software program tangibly included in the machine-readable medium, e.g., the storage unit 908. In some implementations, the computer program can be partially or fully loaded and/or mounted to the apparatus 900 via ROM 902 and/or the communication unit 909. When the computer program is loaded to the RAM 903 and executed by the CPU 901, one or more steps of the above described method 400 can be implemented. Alternatively, in other implementations, the CPU 901 also can be configured in other suitable manners to realize the above procedure/method.

According to example implementations of the present disclosure, there is provided an apparatus for managing a storage system, the apparatus comprising: at least one processor; a volatile memory; and a memory coupled to the at least one processor, the memory having instructions stored thereon, the instructions, when executed by the at least one processor, causing the apparatus to perform acts. The acts include: obtaining a tree index of the storage system, a leaf node among multiple leaf nodes in the tree index comprising a keyword and an attribute of an object among multiple objects in the storage system; obtaining respective attributes of nodes in a set of leaf nodes in the tree index, the set of leaf nodes having the same parent node; and updating the tree index on the basis of respective attributes of nodes in the set of leaf nodes.

According to example implementations of the present disclosure, updating the tree index comprises: adding an abstract field to the parent node in the tree index; determining statistical information on the basis of respective attributes of leaf nodes in the set of leaf nodes; and adding the determined statistical information to the abstract field.

According to example implementations of the present disclosure, the tree index comprises multiple non-leaf nodes at multiple levels, the multiple non-leaf nodes describing the sorting among respective keywords of the multiple objects.

According to example implementations of the present disclosure, obtaining respective attributes of leaf nodes in a set of leaf nodes in the tree index comprises: determining a branch among multiple branches of the tree index according to the multiple levels; determining the set of leaf nodes in the branch; and obtaining respective attributes of leaf nodes in the set of leaf nodes.

According to example implementations of the present disclosure, the acts further comprise: receiving a query request, the query request requesting that information of at least one object matching a target attribute is to be looked up in the storage system; and determining a result for the query request on the basis of statistical information in the abstract field in the updated tree index.

According to example implementations of the present disclosure, the acts further comprise: in response to receiving a delete request for deleting an object with a target keyword from the storage system, looking up a target leaf node associated with the target keyword in the updated tree index on the basis of the target keyword; updating an abstract field in a parent node of the target leaf node; deleting information associated with the target leaf node from the updated tree index; and deleting the object with the target keyword from the storage system.

According to example implementations of the present disclosure, the acts further comprise: in response to receiving an update request for updating an object with a target keyword in the storage system, looking up a target leaf node associated with the target keyword in the updated tree index on the basis of the target keyword; updating an abstract field in a parent node of the target leaf node on the basis of an attribute specified by the update request; updating the target leaf node on the basis of the update request; and updating the object with the keyword in the storage system on the basis of the update request.

According to example implementations of the present disclosure, the acts further comprise: in response to receiving an insert request for inserting a target object with a target keyword to the storage system, looking up a non-leaf node associated with the target keyword in the updated tree index as an insertion point on the basis of the target keyword, a child node of the insertion point being a leaf node; determining the number of objects involved in child nodes of the insertion point; and inserting the target object to the storage system on the basis of the number.

According to example implementations of the present disclosure, the inserting the target object to the storage system on the basis of the number comprises: in response to determining the number does not reach a predefined maximum leaf node number, adding a leaf node to the insertion point, the leaf node comprising a keyword and an attribute of the target object; and updating an abstract field in the insertion point on the basis of the attribute of the target keyword.

According to example implementations of the present disclosure, the inserting the target object to the storage system on the basis of the number comprises: in response to determining the number reaches the predefined maximum leaf node number, performing tree splitting with respect to the insertion point so as to form a first leaf node and a second leaf node, neither of the numbers of objects involved in leaf nodes of the first leaf node and the second leaf node reaching the predefined maximum leaf node number; adding a keyword and an attribute of the target object to the first leaf node; and updating an abstract field of a parent node of the first leaf node and the second leaf node on the basis of an attribute of the first leaf node and the second leaf node respectively.

According to example implementations of the present disclosure, an attribute of an object in the storage system comprise at least one of: a type, position and owner of the object.

According to example implementations of the present disclosure, there is provided a computer program product. The computer program product is tangibly stored on a computer readable medium and comprises machine executable instructions which, when executed, cause a machine to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

What is claimed is:

1. A method, comprising:
   obtaining, by a system comprising a processor, a tree index of a storage system, a leaf node among multiple leaf nodes in the tree index comprising a keyword and an attribute of an object, represented by the keyword, of multiple objects in the storage system;
   obtaining respective attributes of leaf nodes in a set of the multiple leaf nodes in the tree index, the set of the multiple leaf nodes having a parent node that is a same parent node;
   updating the tree index based on the respective attributes of the leaf nodes in the set of the multiple leaf nodes; and
   adding an abstract field to non-leaf nodes other than parent nodes in the tree index, wherein the abstract field comprises one or more attributes of one or more leaf nodes of a child tree that has a non-leaf node as a root node, wherein the one or more attributes comprise an owner of the object of the multiple objects represented by the keyword, and wherein the one or more attributes comprise a position of the object of the multiple objects represented by the keyword.

2. The method of claim 1, wherein the abstract field is a first abstract field, and wherein the updating the tree index based on the respective attributes of the leaf nodes in the set of the multiple leaf nodes comprises:
   adding a second abstract field to the parent node in the tree index;
   determining statistical information based on the respective attributes of the leaf nodes in the set of the multiple leaf nodes, resulting in determined statistical information; and
   adding the determined statistical information to the second abstract field.

3. The method of claim 2, wherein the updating the tree index results in an updated tree index, and further comprising:
   receiving a query request, the query request requesting that information of at least one object of the multiple objects matching a target attribute is to be looked up in the storage system; and
   determining a result for the query request based on the determined statistical information in the abstract field in the updated tree index.

4. The method of claim 1, wherein the tree index comprises multiple non-leaf nodes at multiple levels, the multiple non-leaf nodes describing sorting among respective keywords of the multiple objects;
   wherein the obtaining the respective attributes of the leaf nodes in the set of the multiple leaf nodes in the tree index comprises:
   determining a branch among multiple branches of the tree index according to the multiple levels, and
   determining the set of the multiple leaf nodes in the branch, and
   obtaining the respective attributes of the leaf nodes in the set of the multiple leaf nodes.

5. The method of claim 1, wherein the updating the tree index results in an updated tree index, and further comprising: in response to receiving a delete request for deleting the object of the multiple objects with a target keyword from the storage system,
   looking up a target leaf node of the set of the multiple leaf nodes associated with the target keyword in the updated tree index based on the target keyword;
   updating the abstract field in the parent node of the target leaf node;
   deleting information associated with the target leaf node from the updated tree index; and
   deleting the object with the target keyword from the storage system.

6. The method of claim 1, wherein the updating the tree index results in an updated tree index, and further comprising: in response to receiving an update request for updating the object of the multiple objects with a target keyword in the storage system,
   looking up a target leaf node of the set of the multiple leaf nodes associated with the target keyword in the updated tree index based on the target keyword;
   updating the abstract field in the parent node of the target leaf node based on a defined attribute specified by the update request;
   updating the target leaf node based on the update request; and
   updating the object with the target keyword in the storage system based on the update request.

7. The method of claim 1, further comprising: in response to receiving an insert request for inserting a target object with a target keyword to the multiple objects of the storage system,
   looking up a non-leaf node associated with the target keyword in the updated tree index as an insertion point based on the target keyword, a child node of the insertion point being one of the multiple leaf nodes;
   determining a number of objects involved in child nodes of the insertion point; and
   inserting the target object to the storage system based on the number of objects.

8. The method of claim 7, wherein the inserting the target object to the storage system based on the number of objects comprises: in response to determining the number of objects has not reached a predefined maximum leaf node number, adding one of the multiple leaf nodes to the insertion point, the one comprising a target object keyword and a target object attribute of the target object; and updating the abstract field in the insertion point based on the target object attribute of the target object.

9. The method of claim 7, and wherein the inserting the target object to the storage system based on the number of objects comprises: in response to determining the number of objects has reached a predefined maximum leaf node number, performing tree splitting with respect to the insertion point so as to form a first leaf node and a second leaf node, wherein, after the tree splitting, neither of respective numbers of objects that are involved in respective leaf nodes of the first leaf node and the second leaf node reach the predefined maximum leaf node number;

adding a target object keyword and a first object attribute of the target object to the first leaf node; and updating the abstract field of the parent node of the first leaf node and the second leaf node based on the first object attribute of the first leaf node and a second object attribute of the second leaf node, respectively.

10. An apparatus, comprising:

at least one processor;

a volatile memory; and a memory coupled to the at least one processor and having instructions stored thereon, the instructions, when executed by the at least one processor, causing the apparatus to perform acts, comprising:

obtaining a tree index of the storage system, a leaf node among leaf nodes in the tree index comprising a keyword and an attribute of an object, represented by the keyword, of objects in the storage system;

obtaining respective attributes of leaf nodes in a set of the leaf nodes in the tree index, wherein a parent node of the set of the leaf nodes is a same parent node;

updating the tree index based on the respective attributes of the leaf nodes in the set of the leaf nodes, resulting in an updated tree index; and adding an abstract field to non-leaf nodes other than parent nodes in the tree index, wherein the abstract field comprises an attribute of a leaf node of a child tree that has a non-leaf node as a root node, wherein the attribute comprises an owner of the object of the objects represented by the keyword, and wherein the attribute comprises a position of the object of the objects represented by the keyword.

11. The apparatus of claim 10, wherein the updating the tree index based on the respective attributes of the leaf nodes in the set of the leaf nodes comprises:

adding an abstract field to the same parent node of the set of the leaf nodes in the tree index;

determining statistical information based on the respective attributes of the leaf nodes in the set of the leaf nodes; and adding the statistical information to the abstract field.

12. The apparatus of claim 11, the acts further comprising:

receiving a query request, the query request requesting that information of at least one object of the objects matching a target attribute is to be looked up in the storage system; and determining a result for the query request based on the statistical information in the abstract field in the updated tree index.

13. The apparatus of claim 10, wherein the tree index comprises non-leaf nodes at multiple levels, the non-leaf nodes describing the sorting among respective keywords of the objects, and wherein the obtaining the respective attributes of the leaf nodes in a set of the leaf nodes in the tree index comprises:

determining a branch among branches of the tree index according to the multiple levels;

determining the set of the leaf nodes in the branch; and obtaining the respective attributes of the leaf nodes in the set of the leaf nodes.

14. The apparatus of claim 10, the acts further comprising: in response to receiving a delete request for deleting the object of the objects with a target keyword from the storage system, looking up a target leaf node associated with the target keyword in the updated tree index based on the target keyword;

updating an abstract field in a node that is a parent of the target leaf node;

deleting information associated with the target leaf node from the updated tree index; and deleting the object with the target keyword from the storage system.

15. The apparatus of claim 10, the acts further comprising: in response to receiving an update request for updating the object of the objects with a target keyword in the storage system, looking up a target leaf node associated with the target keyword in the updated tree index based on the target keyword;

updating an abstract field in the parent node of the target leaf node based on a specified attribute included in the update request;

updating the target leaf node based on the update request; and updating the object with the keyword in the storage system based on the update request.

16. The apparatus of claim 10, the acts further comprising: in response to receiving an insert request for inserting a target object with a target keyword to the objects of the storage system, looking up a corresponding non-leaf node associated with the target keyword in the updated tree index as an insertion point based on the target keyword, a child node of the insertion point being one of the leaf nodes;

determining a number of objects involved in child nodes of the insertion point; and inserting the target object to the storage system based on the number.

17. The apparatus of claim 16, wherein the inserting the target object to the storage system based on the number comprises: in response to determining the number does not reach a predefined maximum leaf node number, adding another leaf node to the insertion point, the other leaf node comprising the target keyword and a target attribute of the target object; and updating an abstract field in the insertion point based on the target attribute of the target object.

18. The apparatus of claim 16, wherein the inserting the target object to the storage system based on the number comprises: in response to determining the number reaches the predefined maximum leaf node number, performing tree splitting with respect to the insertion point so as to form a first leaf node and a second leaf node, neither of respective numbers of objects involved in respective leaf nodes of the first leaf node and the second leaf node reaching the predefined maximum leaf node number;

adding the target keyword and a target attribute of the target object to the first leaf node; and updating an abstract field of a node that is a parent of the first leaf node and that is the parent of the second leaf node based on the target attribute of the first leaf node and another attribute of the second leaf node.

19. A computer program product, stored on a non-transitory computer readable medium and comprising machine executable instructions which, when executed, cause a machine comprising a processor to perform operations, comprising:

obtaining a tree index of a storage system, a leaf node of leaf nodes in the tree index comprising a keyword and an attribute of an object, represented by the keyword, of objects in the storage system;

obtaining respective attributes of the leaf nodes in the tree index, wherein a parent node of the leaf nodes is a same parent node;

updating the tree index based on the respective attributes of the leaf nodes; and adding an abstract field to non-leaf nodes other than parent nodes in the tree index, wherein the abstract field comprises attributes of a leaf node of a child tree that takes a non-leaf node as a root node, wherein the attributes comprise an owner of the object of the objects represented by the keyword, and wherein the attributes comprise a position of the object of the objects represented by the keyword.

20. The computer program product of claim 19, wherein the attribute of the object of the objects represented by the keyword comprises a type of the object.

* * * * *